United States Patent
Hachisu et al.

[11] 4,066,539
[45] Jan. 3, 1978

[54] OIL-RECOVERING MATERIAL AND PROCESS FOR PREPARING AND USING THE SAME

[75] Inventors: Takeshi Hachisu; Akinari Uchida, both of Ibaraki, Japan

[73] Assignee: Hitachi, Ltd., Japan

[21] Appl. No.: 744,401

[22] Filed: Nov. 23, 1976

[30] Foreign Application Priority Data

Nov. 25, 1975  Japan ............................. 50-140196
Nov. 25, 1975  Japan ............................. 50-140197

[51] Int. Cl.² ............................................. C02B 9/02
[52] U.S. Cl. ........................................ 210/36; 134/7;
 210/DIG. 26; 427/222; 428/407
[58] Field of Search .......... 210/36, 40, 502, DIG. 26;
 427/222; 428/407; 106/160, 212, 213; 134/7;
 208/8

[56] References Cited

U.S. PATENT DOCUMENTS

| 3,102,050 | 8/1963 | Canterino et al. | 427/222 |
| 3,617,566 | 11/1971 | Oshima et al. | 210/40 |
| 3,676,357 | 7/1972 | Ciuti et al. | 210/36 |

*Primary Examiner*—Wilbur L. Bascomb, Jr.
*Assistant Examiner*—Ivars Cintins
*Attorney, Agent, or Firm*—Craig & Antonelli

[57] ABSTRACT

Atactic polypropylene is cooled, disintegrated into granules, mixed with cereal powders such as wheat flour, starch powders, etc. thereby to deposit the cereal powders around the granules, and returned to room temperature thereby to prepare an oil-recovering material. The oil-recovering material is spread onto surfaces of sea water with floating oil or surfaces of land area fouled with oil, such as sand beach, etc. to recover the oil therefrom.

6 Claims, 1 Drawing Figure

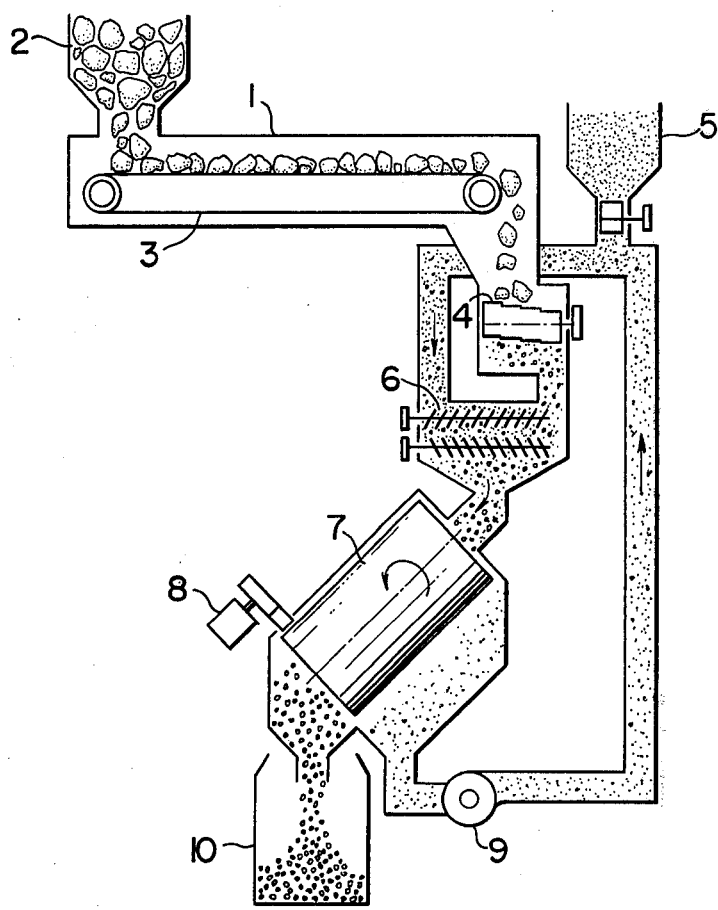

OIL-RECOVERING MATERIAL AND PROCESS FOR PREPARING AND USING THE SAME

BACKGROUND OF THE INVENTION

This invention relates to an oil-recovering material for recovering oil floating on the surfaces of sea water or fouling oil distributed on land area such as sand beach.

Heretofore, oil floating on surfaces of sea, river, or waters, or oil fouling sand beach, etc. have been recovered and removed, for example, by spreading fibrous state polypropylene onto the surfaces of sea, river or waters, or sand beach, but a large amount of expenses is required for such recovery owing to the high cost of polypropylene.

SUMMARY OF THE INVENTION

An object of the present invention is to provide an oil-recovering material capable of recovering oil floating on the surface of sea water, etc. or oil fouling sand beach, etc.

The present oil-recovering material comprises granules of atactic polypropylene and cereal powders, such as wheat flour, starch powder, etc., deposited around the granules.

The present process for preparing an oil-recovering material comprises cooling atactic polypropylene to −20° to −30° C, disintegrating the polypropylene into granules, depositing cereal powders such as wheat flour, starch powder, etc. around the granules, and then returning the deposited granules to room temperature.

BRIEF DESCRIPTION OF THE DRAWING

The accompanying drawing is a schematic view of an entire apparatus for preparing an oil-recovering material.

DESCRIPTION OF THE EMBODIMENTS OF THE INVENTION

Atactic polypropylene, which will be hereinafter after referred to as APP, is a by-product formed in a process for producing polypropylene, and takes 5 to 19 % by weight in the entire products including the desired product, polypropylene, and other intermediate by-products. APP has a plasticity and adhesiveness at room temperature, and thus is difficult to disintegrate. However, when APP is cooled to a low temperature range, such as −20° to −30° C, APP becomes brittle like glass, and can be disintegrated into granules by an appropriate disintegrator. When APP is returned to room temperature from said low temperature range, APP again has the plasticity and adhesiveness. Furthermore, APP has a property of absorbing various liquid oily materials including crude oil. Furthermore, APP has a specific gravity of 0.80 to 0.86, as shown in the following table, and thus has a better floating ability than various oil-recovering materials so far used.

Table

Comparison of specific gravity of APP with those of oil-recovering materials so far used

| Materials | Specific Gravity |
| --- | --- |
| APP | 0.80 – 0.86 |
| Polypropylene fibers | 0.91 |
| Polyethylene fibers | 0.95 |
| Nylon fibers | 1.14 |
| Vinylon fibers | 1.26 – 1.30 |
| Polyester fibers | 1.38 |

Table -continued

Comparison of specific gravity of APP with those of oil-recovering materials so far used

| Materials | Specific Gravity |
| --- | --- |
| Cotton fibers | 1.54 |

The by-product APP still now has such a narrow application field that it is used only as a raw material for adhesive or as a fuel in special fields. As compared with the amount of APP by-produced, the amount of APP applied is so small that the cost of APP is about one-tenth the cost of the desired product polypropylene.

As described above, APP is brittle in the low temperature range, but regains the original properties at room temperature. That is, if the disintegrated granular APP is left standing at room temperature, the APP granules adhere to one another, and agglomerate into larger masses, giving some trouble when used. Therefore, cereal powders such as wheat flour, starch powders, etc. are deposited onto the APP granules after the disintegration but before returning to room temperature, to prevent mutual adhesion at room temperature.

A disintegrator especially developed for disintegrating APP into granules in a low temperature range will be described below, referring to the accompanying drawing.

In FIGURE, a cooler 1 is provided with a nozzle (not shown in the drawing), and a cooling gas is injected into cooler 1 from the nozzle. A hopper 2 for feeding APP is positioned above one end of a conveyor 3 provided inside the cooler 1. A disintegrator 4 is provided below the other end of conveyor 3, and disintegrated granules of APP are screened by a filter (not shown in the drawing), and granules of desired granule sizes are allowed to fall through the filter. Agitators 6 are provided below disintegrator 4 and a hopper 5 for feeding cereal powders. A trommel 7 is provided below the stirrers 6, and is rotated by a driving means 8. A pump 9 for transporting the cereal powders is provided between hopper 5 for feeding the cereal powders and trommel 7. A receiving hopper 10 is provided below trommel 7 and positioned to receive the falling products.

According to said structure, APP is charged into hopper 2, and transferred by conveyor 3 from left to right in the drawing. During the transfer, cooling gas is injected into cooler 1, whereby APP is cooled to −20° to −30° C, and APP has such a brittleness as that of glass. APP having such a brittleness falls into disintegrator 4, and is disintegrated. The disintegrated APP is screened by the filter provided in disintegrator 4, and only granules having desired grain sizes are sent to agitators 6. When wheat flour is used as the cereal powders, the wheat flour is sent to agitators 6 from hopper 5, whereby the wheat flour is made to adhere to circumferences of the granules of APP. Then, the granules of APP in that state are sent to trommel 7, where excess wheat flour around the granules of APP is shaked off at room temperature or a temperature near room temperature, and only the product oil-recovering material is placed into receiving hopper 10. On the other hand, excess wheat flour shaked off from trommel 7 is returned to stirrers 6 through pump 9, and reused.

The oil-recovering material thus prepared is spread onto surfaces of sea water or fresh water with floating oil or sand beach fouled with oil to absorb oil onto the oil-recovering material. The oil-recovering material that has absorbed oil floats on the surfaces of water and are simply recovered from the surfaces of water. The oil-recovering materials on the sand beach can be also simply recovered by collecting them. Thus, the present oil-recovering material can simply recover oil from the surfaces of sea water, etc, and also can be prepared at a low cost. That is, expenses for recovering oil are reduced accordingly.

What is claimed is:

1. An oil-recovering material which comprises atactic polypropylene granules and a cereal powder deposited onto the surface of the granules.

2. An oil-recovering material according to claim 1, wherein the cereal powder is wheat flour or a starch powder.

3. A method for the recovery of oil from water-containing oil or sand-containing oil comprising contacting the water-containing oil or sand-containing oil with the product of claim 1, whereby the oil is absorbed by the oil-recovering product.

4. A process for preparing an oil-recovering material, which comprises:
   a. cooling atactic polypropylene to a temperature range of $-20°$ C to $-30°$ C thereby making the polypropylene brittle;
   b. disintegrating the cooled atactic polypropylene into granules;
   c. depositing a cereal powder onto the surface of the granules; and
   d. returning the cereal powder-deposited atactic polypropylene granules to room temperature.

5. A process according to claim 3, wherein the cereal powder is wheat flour or a starch powder.

6. A product according to the process of claim 4.

* * * * *